Oct. 8, 1957 E. A. SCHONROCK 2,808,948
SELF-LOADING VEHICLE FOR CYLINDRICAL TANKS
Filed Aug. 5, 1955 3 Sheets-Sheet 1

Edwin A. Schonrock
INVENTOR.

BY
Attorneys

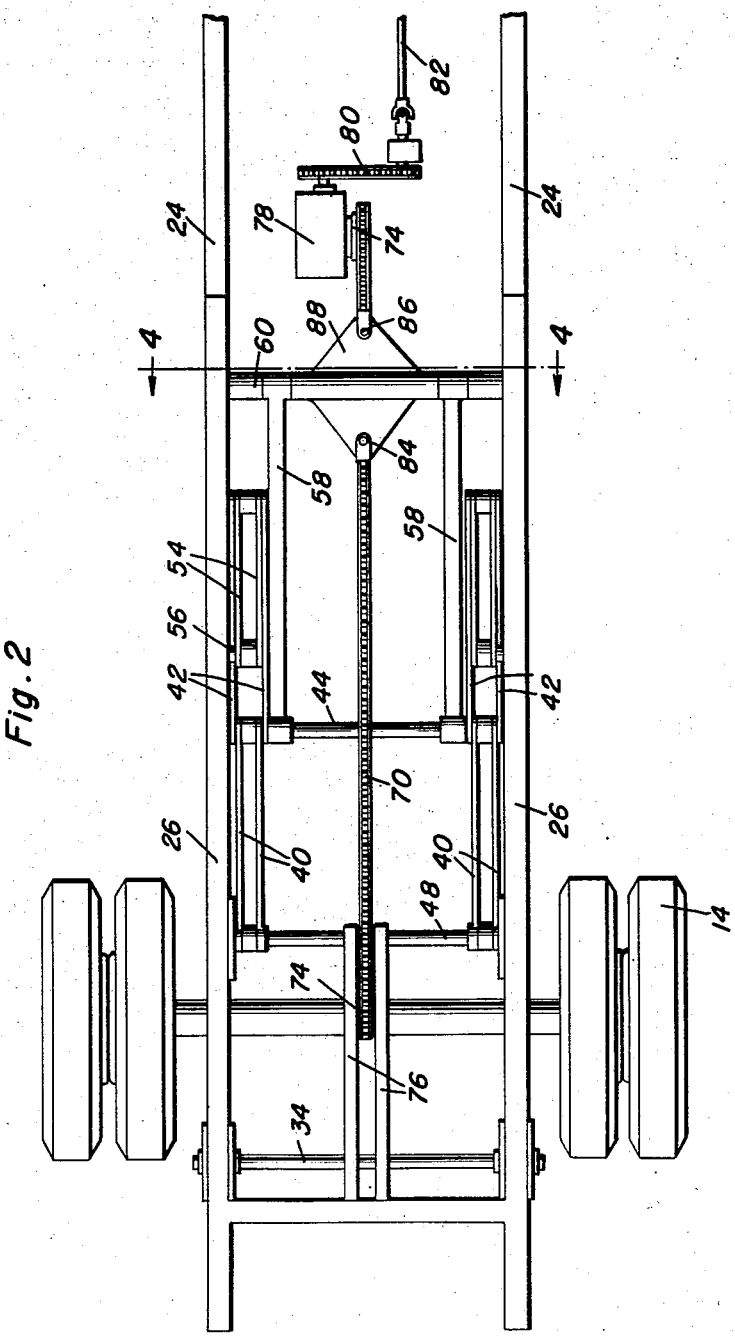

Oct. 8, 1957     E. A. SCHONROCK     2,808,948
SELF-LOADING VEHICLE FOR CYLINDRICAL TANKS
Filed Aug. 5, 1955     3 Sheets-Sheet 3
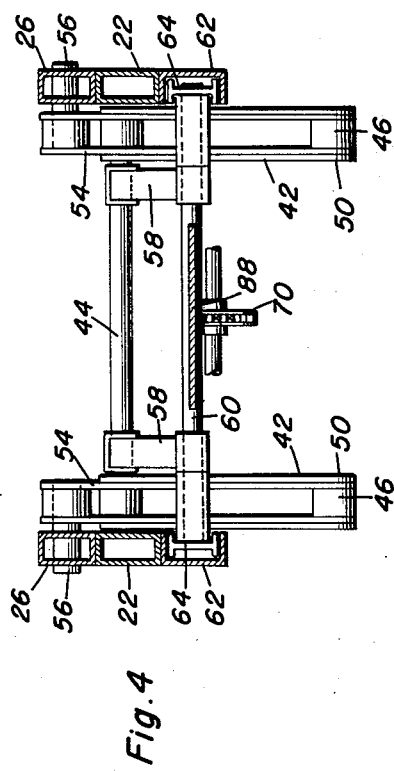
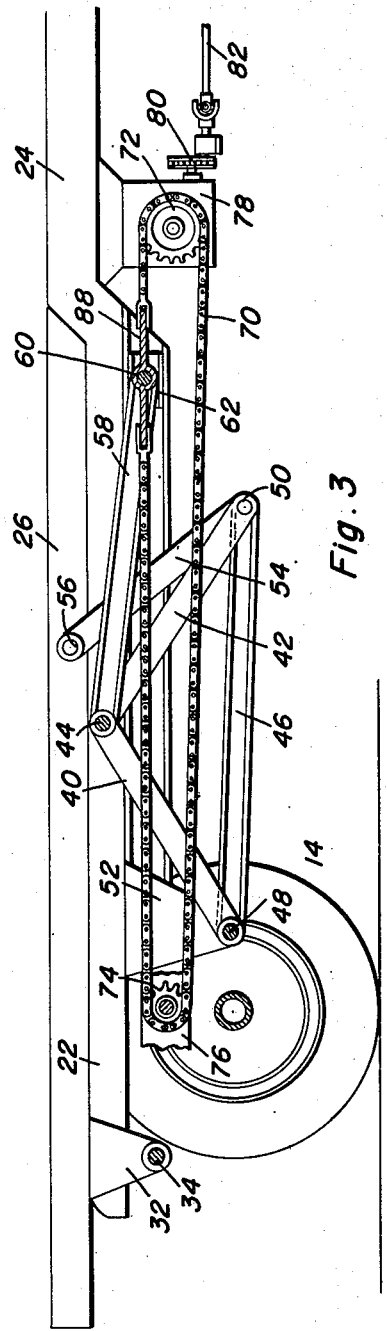
Edwin A. Schonrock
INVENTOR.

United States Patent Office 2,808,948
Patented Oct. 8, 1957

2,808,948

SELF-LOADING VEHICLE FOR CYLINDRICAL TANKS

Edwin A. Schonrock, San Angelo, Tex.

Application August 5, 1955, Serial No. 526,645

12 Claims. (Cl. 214—77)

This invention comprises novel and useful improvements in a truck and trailer body and a method for loading, carrying and unloading cylindrical tanks and similar objects, and more specifically relates to a truck or trailer vehicle particularly adapted to more conveniently and easily load large and bulky cylindrical and other objects thereon, transport them in a secure manner and facilitate the unloading of the same from the vehicle.

The primary object of this invention is to provide a vehicle having provision to facilitate the loading thereon of cylindrical or similar shaped bulky articles, such as tanks, drums and the like, securely store a multiplicity of such objects upon the vehicle for transportation thereby, and facilitate the unloading of the objects.

A further important object of the invention is to provide an apparatus in conformity with the preceding object whereby a tank, a cylindrical or other object when disposed in a vertical position may be easily engaged by the apparatus and tilted into a horizontal position for loading upon the vehicle.

A further important object of the invention is to provide an apparatus wherein the conventional power take-offs of trucks and trailers may be utilized to facilitate and perform the loading, storing and unloading operations.

An important object of this invention is to provide an apparatus for handling and transporting, and placing large, bulky and heavy objects similar to oil field tanks, concrete culverts or a plurality of trailer bodies containing sand, gravel, concrete and the like.

A further object of the invention is to provide in a truck or trailer vehicle a carrying framework whereby a multiplicity of heavy articles, of a generally cylindrical shape, may be mechanically loaded, transported and unloaded with a minimum of hand labor and attention and with maximum efficiency and economy.

Another object of this invention is to provide a simple mechanism to effect the operations of handling, transporting and placing during unloading of bulky objects and the like.

Yet another object of this invention is to provide a means whereby two or more trailer bodies or boxes, similar to the body of a dump trailer or truck and which may be loaded with dissimilar materials may be transported and unloaded in a minimum of time.

Still another object of this invention is to provide a dumping means of a sufficiently high angularity for the efficient discharge of viscous or adhesive materials from a truck or trailer body or cylindrical container or the like.

A still further important object of this invention is to provide a trailer or truck frame having a fixed load carrying portion or bed and a rearwardly disposed relatively movable and vertically tiltable bed portion to facilitate the loading or unloading of articles upon the vehicle bed.

A still further important object of the invention is to provide an apparatus in conformity with the preceding object wherein an improved linkage and lever arrangement offering a considerable mechanical advantage shall be provided to positively actuate the tiltable section of the vehicle bed between a vertical or sharply inclined loading and unloading position and a horizontal load carrying position.

And a final important object of the invention to be specifically enumerated herein resides in the provision of an apparatus wherein the framework of a trailer or truck shall support the complete power operating mechanism for positively raising or lowering a pivoted rear portion of the bed of the vehicle for the loading and unloading of articles therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a top plan view of the chassis of the trailer in accordance with Figure 1, the tiltable rear section of the trailer bed being shown in its horizontal load carrying position;

Figure 3 is a vertical longitudinal sectional view through the arrangement of Figure 2;

Figure 4 is a horizontal sectional detail view of a portion of the operating mechanism for positively raising or lowering the tiltable portion of the trailer bed, being taken substantially upon the plane indicated by the section line 4—4 of Figure 2.

Although the drawings, for the sake of simplicity of illustration, disclose a trailer chassis having the principles of this invention applied thereto, it will be readily apparent that these principles may also be employed in the chassis of a truck. Accordingly, throughout the specification and claims, the term "truck" has been used as a generic term comprehending within its scope both a truck construction and a trailer construction.

Figure 1:
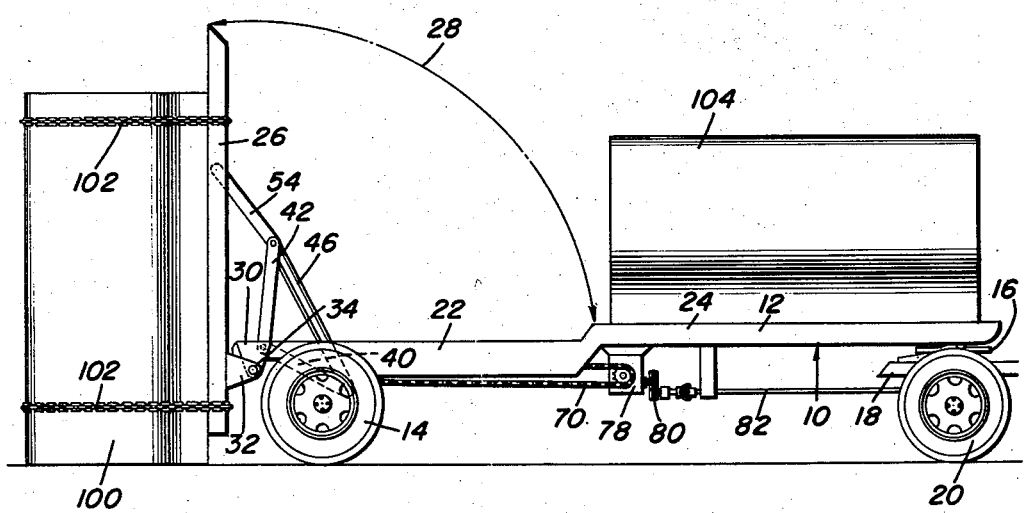
Figure 1 is a side elevational view of a trailer showing one manner of applying the principles of this invention, the tiltable rear section of the bed of the trailer being shown in its vertical loading or unloading position, the arrow indicating the movement of the same to a horizontal load carrying position.

Referring first to Figure 1, it will be seen that the truck or trailer vehicle, indicated generally by the numeral 10, includes a chassis or supporting frame consisting of the longitudinal box girder or channel members 12 having suitable cross-bracing, not shown, to form a rigid chassis adapted to be mounted upon a rear axle assembly 14 and to be either provided with the usual front wheel assembly of a truck (not shown) or to be provided with an upper fifth wheel assembly 16 mounted upon the rear portion of a tractor chassis 18 provided with a wheel assembly 20.

In accordance with the present invention, the chassis frame member of the vehicle is provided with a truck bed. For that purpose, the longitudinal frame members 12 have their rear ends angulated and laterally depressed to provide rear portions of the chassis or frame, as at 22. The truck bed thus consists of a forward or stationary section, the latter consisting of the forward portions 24 of the longitudinal chassis beams 12, and a rear section which is pivotally mounted upon the chassis 22, as set forth hereinafter, being movable and vertically tiltable between a sharply inclined, substantially vertical loading or unloading position, as shown in Figure 1, and a substantially horizontal load carrying position, as shown in Figures 2 and 3. The rear section consists of longitudinally extending frame members 26 provided with suitable cross-bracing therebetween (not shown) and is of such length that the same will fit in the depression formed in the longitudinal frame members 12 by the depressed rear portions 22 thereof. The tilting or pivotal movement of the rear sections is indicated by the arrow 28 in Figure 1. When the rear section is moved to its lowered or substantially horizontal load carrying position, as shown in Figure 3, the upper surfaces of the front and rear sections 12 and 26 will lie in substantially the same plane as a continuation of each other to thus provide a truck bed which, as seen best in Figure 3, extends considerably beyond the rear end of the chassis of the vehicle for a purpose to be subsequently set forth.

Observing particularly Figures 1 and 3, it will be seen that the rear end of the chassis depressed portion 22 is provided with depending brackets 30 and complementary depending brackets 32 are carried by the rear, movable section adjacent their rear ends and are pivoted to the first mentioned brackets 30, as by a transverse axle or pivot pin 34. Due to the depending brackets and the lowered pivot axle 34, the rear section in its horizontal load carrying position may rest directly upon the top surface of the depressed portion 22 of the chassis, as shown in Figure 3, or may be swung upwardly and outwardly beyond the rearward end of the chassis, as shown in Figure 1, into a sharply inclined loading or unloading position.

Figure 5:
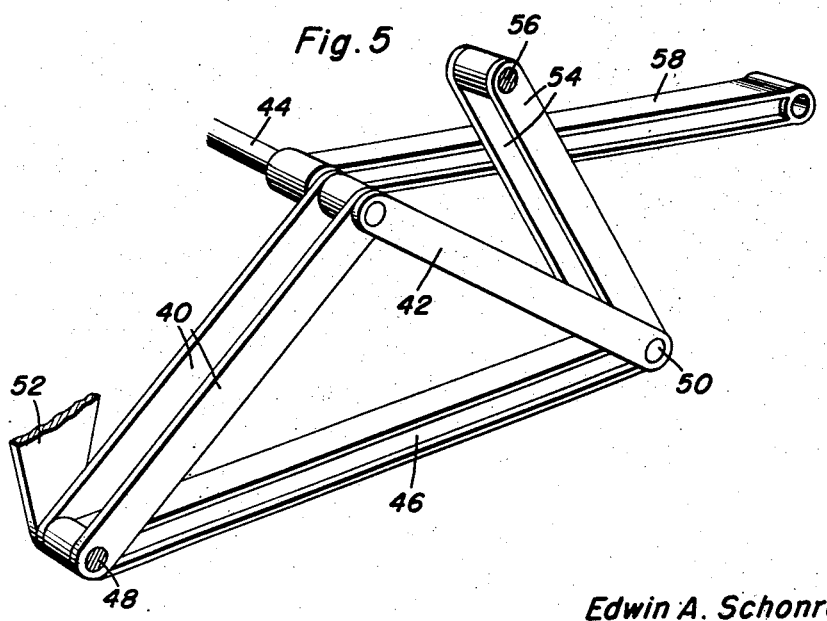
Figure 5 is a fragmentary perspective view showing a portion of the linkage forming a part of the operating mechanism of the apparatus.

In order to move the rear section between its horizontal and vertical positions, there is provided a linkage assembly which is operatively connected to the rear portion 22 of the chassis and to the rear movable section. For that purpose, there is provided a pair of linkages, one disposed adjacent each of the side members 22 of the chassis. As will be seen especially from Figure 5, each linkage comprises a substantially triangular frame having pivots at each of its apices. Thus, each linkage consists of spaced pairs of links 40, 42 which are pivoted together, the linkages being connected by a transverse axle or pivot 44. The opposite ends of the links 40 and 42 are connected by a link or beam 46 through pivot pins 48 and 50. The pivot pin 48 comprises a transverse bar which is carried by a pair of depending brackets 52 which are mounted upon the chassis rear portion 22, as will be best seen from Figure 3. The pivot pins 50 are also connected to pairs of elevating links 54 whose upper ends are connected as by pivot pins 56 to the frame members 26 of the rear movable section. A pair of connecting rods 58 are journaled at one end upon the above mentioned shaft 44, and at their other ends are secured to and journaled upon a transversely disposed cross-arm 60.

Referring now especially to Figures 3 and 4, it will be seen that a pair of channel members 62 are secured to the under sides of the rearward portions 22 of the chassis frame of the truck and constitute guides for slidably receiving shoes or guiding members 64 carried by the ends of the cross-rod 60. Thus, the cross-rod 60 is confined to guided, longitudinal sliding movement forwardly and rearwardly of the chassis frame members.

As so far described, it will now be apparent from an inspection of the figures of the drawings that when the cross-rod 60 is moved rearwardly in its guide members 62, the connecting rods 58 will impart by their connection at 44 to the triangular linkage, a counter-clockwise tilting motion of the same about its fulcrum 48. This motion, in turn, through the connection of the elevating arms 54 with the movable rear section at 56, will cause an upward tilting movement of the latter about its pivot 34. It will be observed that forward or rearward movement of the cross-rod 60 will thus produce a positive actuation of the tiltable rear section between its loading or unloading positions and its lowered or load carrying position.

An actuating means is provided for imparting this controlled and positive forward and rear sliding movement to the cross-rod 60. The actuating mechanism, exemplified in one form of the drawings, although the principle of the same is not limited thereto, may conveniently comprise a sprocket chain 70 extending centrally and longitudinally of the chassis and entrained over a forward driving sprocket 72 and a rearward idler sprocket 74. The latter, as shown in Figures 2 and 3, may be journaled between a pair of parallel longitudinally extending medially disposed spring members 76 which are suitably carried by the chassis. The driving sprocket 72 is carried by a reduction gear assembly 78 of any suitable construction and which is mounted beneath the forward section 24 of the chassis. The sprocket 72 constitutes an output member for the reduction gearing assembly, and power may be applied to this assembly as by means of a sprocket drive 80 which, in turn, is actuated by a power take-off shaft 82 which may be associated with the power plant of the tractor or truck (not shown) in any conventional manner. Thus, the entire power operating means for imparting tilting movement to the rear movable section is carried by and disposed beneath the chassis of the truck or tractor vehicle.

Referring now to especially to Figures 2 and 3, it will be seen that the two ends of the chain are connected as by pins 84 and 86 to a cross-plate 88 which is journaled upon the cross-rod 60 and is pivotable thereon. As so far described, it will be seen that rotation of the sprocket 72 in a selected direction by the power means will positively move the cross-head assembly consisting of the cross-head 88 and the cross-rod 60, and through the above described connection of the rod 60 with the linkage assemblies, will impart positive pivotal movement in either direction to the movable rear section.

The operation of this apparatus and the method of loading, unloading and transporting articles thereby is as follows. Referring to Figure 1, it will be seen that after the rear movable section has been moved into a substantially vertical or sharply inclined loading position, the apparatus is backed against the object 100 which may, for example, consist of a large cylindrical tank, concrete culvert or the like, and which is disposed in a vertical position. In this position, the rearward end of the movable section is disposed closely adjacent the ground, and the bed of the movable section is placed in contact with the article 100. By means of chains 102 or other suitable fastening means, the object is rigidly clamped to the section 26. The latter is then tilted, as indicated by the arrow in Figure 1 into a substantially horizontal load carrying position. If more than one article is to be carried, the latter may be moved forwardly from the rear section to the forward section 24 as indicated by the numeral 104, and successive articles may then be loaded upon the vehicle.

It will thus be observed that the section 26 constitutes both an article loading means for lifting an article upon the bed of the truck, and for unloading the same at its destination, as well as a load carrying means.

It will be observed that various types of articles can be readily handled by this apparatus, and the articles designated by the numerals 100 and 104 may not only comprise tanks or culverts or other cylindrical objects, but may also include boxes or dump bodies of trucks or the like. Thus, such bodies may contain quite dissimilar contents and yet may be readily handled as units by this apparatus. It will also be observed that since the movable rear section 26 can move to a substantially vertical unloading position, the contents of such bodies can be readily dumped, even though they may be of a very viscous nature.

It should be particularly noted that although a chain drive means has been illustrated and described as the actuating means for a linkage system for imparting tilting movement to the rear section 26, in some instances, the principles of the invention may be successfully applied with any other desired type of tilting mechanism and actuating means therefor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A chassis construction for trucks and trailers comprising a bed including a forward stationary section and a rear pivoted section, pivot means mounting said rear section for vertical tilting movement between a sharply inclined loading and unloading position and a substantially horizontal load carrying position, said sections having top load supporting surfaces aligned with each other in the loading position of the rear section, operating mechanism operatively associated with said rear section and adapted for connection with a source of power for tilting the rear section.

2. The combination of claim 1 wherein said truck bed has a depression at its rear end, said rear section in its load carrying position being receivable in said depression for alignment with said forward section whereby to form a rearward continuation of the latter.

3. The combination of claim 1 wherein the rear end of said chassis has depending brackets, said rear section adjacent its rear end having depending complementary brackets, said pivot means including a pivotal connection between the brackets and the complementary brackets.

4. The combination of claim 1 wherein said rear section has its rear end overlying the rear end of said chassis and terminating at such distance from said pivot means that it will be disposed in closely spaced relation to the surface upon which the truck rests when the rear section is disposed in said sharply inclined loading and unloading position.

5. The combination of claim 1 wherein said operating mechanism is disposed entirely beneath said truck bed and is supported entirely by said chassis.

6. A chassis construction for trucks and trailers comprising a bed including a forward stationary section and a rear pivoted section, pivot means mounting said rear section for vertical tilting movement between a sharply inclined loading and unloading position and a substantially horizontal load carrying position, said sections having top load supporting surfaces alined with each other in the loading position of the rear section, operating mechanism operatively associated with said rear section and adapted for connection with a source of power for tilting the rear section, said operating mechanism being disposed entirely beneath said truck bed and being supported entirely by said chassis, said operating mechanism including a linkage assembly disposed at each side of the chassis, means pivoting said linkage assembly to said chassis and to the rear section for vertical pivoting movement of the latter, actuating means disposed centrally of the chassis for causing movement of said linkage.

7. The combination of claim 1 wherein said operating mechanism includes a cross-head assembly, means connecting the cross-head assembly to the rear section, actuating means disposed below the chassis and positioned longitudinally and medially thereof for causing movement of said cross-head assembly.

8. The combination of claim 1 wherein said operating mechanism includes a cross-head assembly, means connecting the cross-head assembly to the rear section, actuating means for causing movement of said cross-head assembly, guide means secured to and disposed below said chassis receiving said cross-head assembly for longitudinal guided movement.

9. The combination of claim 1 wherein said operating mechanism includes a cross-head assembly, means connecting the cross-head assembly to the rear section, actuating means for causing movement of said cross-head assembly, said connecting means including a lever pivoted to the chassis and disposed therebelow, and means operatively connecting the lever to the rear section and to a source of power.

10. A chassis construction for trucks and trailers comprising a bed including a forward stationary section and a rear pivoted section, pivot means mounting said rear section for vertical tilting movement between a sharply inclined loading and unloading position and a substantially horizontal load carrying position, said sections having top load supporting surfaces alined with each other in the loading position of the rear section, operating mechanism operatively associated with said rear section and adapted for connection with a source of power for tilting the rear section, said operating mechanism including a cross-head assembly, means connecting the cross-head assembly to the rear section, actuating means for causing movement of said cross-head assembly including an endless chain disposed longitudinally and medially of said chassis and therebeneath and connected to the cross-head assembly, a guide means secured to and disposed beneath the chassis for slidably guiding said crosshead assembly for movement longitudinally of said chassis, means operatively connecting the chain to a source of power.

11. The combination of claim 1 including an upper fifth wheel mounted upon the front end of the chassis for connection to a tractor lower fifth wheel assembly.

12. The combination of claim 1 including an upper fifth wheel mounted upon the front end of the chassis for connection to a tractor lower fifth wheel assembly, said operating mechanism being mounted beneath said chassis and being adapted for attachment to the tractor power take-off.

References Cited in the file of this patent

UNITED STATES PATENTS

| 1,028,525 | Auth | June 4, 1912 |
|---|---|---|
| 1,188,932 | Griffith | June 27, 1916 |
| 1,457,054 | Bratt | May 29, 1923 |
| 1,552,281 | Edwards | Sept. 1, 1925 |
| 2,327,135 | Scott | Aug. 17, 1943 |
| 2,606,673 | Young | Aug. 12, 1952 |
| 2,736,443 | Seidle | Feb. 28, 1956 |
| 2,741,383 | Leckert | Apr. 10, 1956 |